US006959230B1

(12) United States Patent
Leibu et al.

(10) Patent No.: US 6,959,230 B1
(45) Date of Patent: Oct. 25, 2005

(54) VENDING MACHINE SYSTEM AND METHOD

(75) Inventors: Mark H. Leibu, St. Louis, MO (US); Gilbert W. Van Cleve, Ballwin, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 0 days.

(21) Appl. No.: 10/899,938

(22) Filed: Jul. 27, 2004

Related U.S. Application Data

(62) Division of application No. 09/970,623, filed on Oct. 3, 2001, now Pat. No. 6,772,048.

(51) Int. Cl.[7] .............................................. G06F 17/00
(52) U.S. Cl. ...................................... 700/231; 340/5.9
(58) Field of Search ............................... 700/231, 232, 700/236, 237, 241, 244; 221/131; 340/5.9, 340/5.92, 3.1

(56) References Cited

U.S. PATENT DOCUMENTS

| | | | | |
|---|---|---|---|---|
| 4,412,292 | A | 10/1983 | Sedam et al. | 364/479 |
| 4,766,548 | A | 8/1988 | Cedrone et al. | 364/479 |
| 5,207,784 | A | 5/1993 | Schwartzendruber | 221/6 |
| 5,450,938 | A | 9/1995 | Rademacher | 194/206 |
| 5,544,784 | A | 8/1996 | Malaspina | 221/135 |
| 5,647,220 | A | 7/1997 | Kawaguchi et al. | 62/89 |
| 5,701,252 | A | 12/1997 | Facchin et al. | 364/479 |
| 5,787,149 | A | 7/1998 | Yousefi et al. | 379/59 |
| 5,930,771 | A | 7/1999 | Stapp | 705/28 |
| 5,941,363 | A | 8/1999 | Partyka et al. | 194/217 |
| 5,960,344 | A | 9/1999 | Mahany | 455/432 |
| 5,997,170 | A | 12/1999 | Brodbeck | 364/479.06 |
| 6,038,491 | A | 3/2000 | McGarry et al. | 700/231 |
| 6,056,194 | A | 5/2000 | Kolls | 235/381 |
| 6,430,470 | B1 | 8/2002 | Nakajima et al. | 700/237 |
| 6,462,644 | B1 | 10/2002 | Howell et al. | 340/5.92 |
| 6,487,540 | B1 | 11/2002 | Smith et al. | 705/21 |
| 6,505,095 | B1 * | 1/2003 | Kolls | 700/244 |
| 6,535,726 | B1 | 3/2003 | Johnson | 455/706 |
| 6,772,048 | B1 * | 8/2004 | Leibu et al. | 700/241 |

FOREIGN PATENT DOCUMENTS

| | | | |
|---|---|---|---|
| WO | 9922346 | 5/1999 | G07F 7/00 |
| WO | 0038443 | 6/2000 | H04Q 7/22 |

* cited by examiner

*Primary Examiner*—Khoi H. Tran
(74) *Attorney, Agent, or Firm*—Haverstock, Garrett & Roberts LLP

(57) ABSTRACT

A system and process for controlling one or more vending machine devices, including the provision of a communications and control system for effecting an interchange of information over a wireless bus between and among the vending machine devices, the communications and control system including a plurality of communications portions associated with respective vending machine components and operable to transmit and receive short distance communications signals, the vending machine components being positioned within range of the short distance communications signals to define a peer-to-peer network having a wireless communications bus accessible through the communications portions interconnecting the positioned vending machine components for point-to-point communications.

27 Claims, 7 Drawing Sheets

VENDING MACHINE SYSTEM AND METHOD

This application is a division of U.S. patent application Ser. No. 09/970,623, filed Oct. 3, 2001, and issued as U.S. Pat. No. 6,772,048, on Aug. 3, 2004.

FIELD OF INVENTION

The present invention is directed to the vending machine art, and more particularly to a device which accepts credit including coins and currency as well as credit card and smart card entries, and uses the information it receives to control the operation of one or more vending machines, and it does so without requiring any electrical wire connections between the vending machines. The invention has several novel features as described in detail hereinafter including the fact that one or more modules of one or more vending machines can be equipped with a "short distance RF communication" device. Another novel feature resides in the fact that only one vendor need be so equipped to allow receiving of credit but all of the vendors can vend products for that credit. The present wireless system can also monitor wireless systems of vending machines from a central location as will be described. The present device accomplishes these novel things without the possibility of third parties being able to tap into and cheat the system. This makes the present system particularly adaptable to situations where two or more vending machines or the like are controlled and it enables every vending machine that is controlled by the subject device to be operated independently and the amount of credit entered can be used to vend articles from one or from a plurality of machines each of which may or may not have the same or similar type of products. It can therefore be seen that the present invention teaches the construction and operation of means for safely and accurately controlling the operations of a plurality of different things such as vending machines without requiring any physical connection between the machines. The present invention also enables the use of a telephone or telephone-like device to be used to gather information and to produce controls in a manner which has not heretofore been seen, particularly in the vending art.

The present device or system eliminates the need for physical connections such as wire or cable connections between the controls and the devices being controlled and can use a controller of a known construction to control one or more vending machines or the like. Such a device will typically have a base band control formed of firmware and will operate as a host controller for controlling the operations of many different vending machines or the like, and it can be constructed to do so without requiring more than one host controller.

In summary, the present device has two principal novel features including being a wireless communication system which may be used to control vending machines or like devices and only one device need be equipped to receive credit but any one or more of a plurality of vending or like machines can be controlled to dispense products, make change or perform other functions for an established credit entry or deposit. The present invention represents a versatile and flexible control which can be used to control a plurality of the same or similar devices.

BACKGROUND OF THE INVENTION

The present invention is directed to a new and relatively inexpensive method of intercommunicating and controlling machines without requiring the usual harnesses and other electrical connections, and the present invention provides a broadly based way of credit accumulation and a flexible way for communicating with vending machines or like devices to control the operations thereof and to keep track of the credit that remains.

OBJECTS OF THE INVENTION

It is a principal object of the present invention to provide means for controlling the operations of vending machines and like devices including controlling the vending and other operations including the entries of deposits or credit, the dispensing of the product or products being vended and the return of excess deposits or credit entries to the customer without the use of the internet or an external harness that connects the modules, but rather in a wireless configuration.

Another object is to control the operation of one or more vending machines without requiring any electrical or other physical connections between the machines.

Another object is to provide means for controlling vending machines and the like in a manner which makes it much more difficult for third parties to tap into or interfere with or cheat the system including the change making procedures.

Another object is to provide a relatively versatile easy to operate means for controlling a number of operations including a number of machines operated from the same or from a common source.

Another object is to provide means for making it difficult for third parties to tap into or interfere with the operation of devices such as vending machines and the controls therefor.

BRIEF DESCRIPTION OF THE DRAWINGS

FIG. 1 is a block diagram of the various controls that can be used to control the functions of a vending machine or the like;

DESCRIPTION OF PREFERRED EMBODIMENTS

Figure 1:
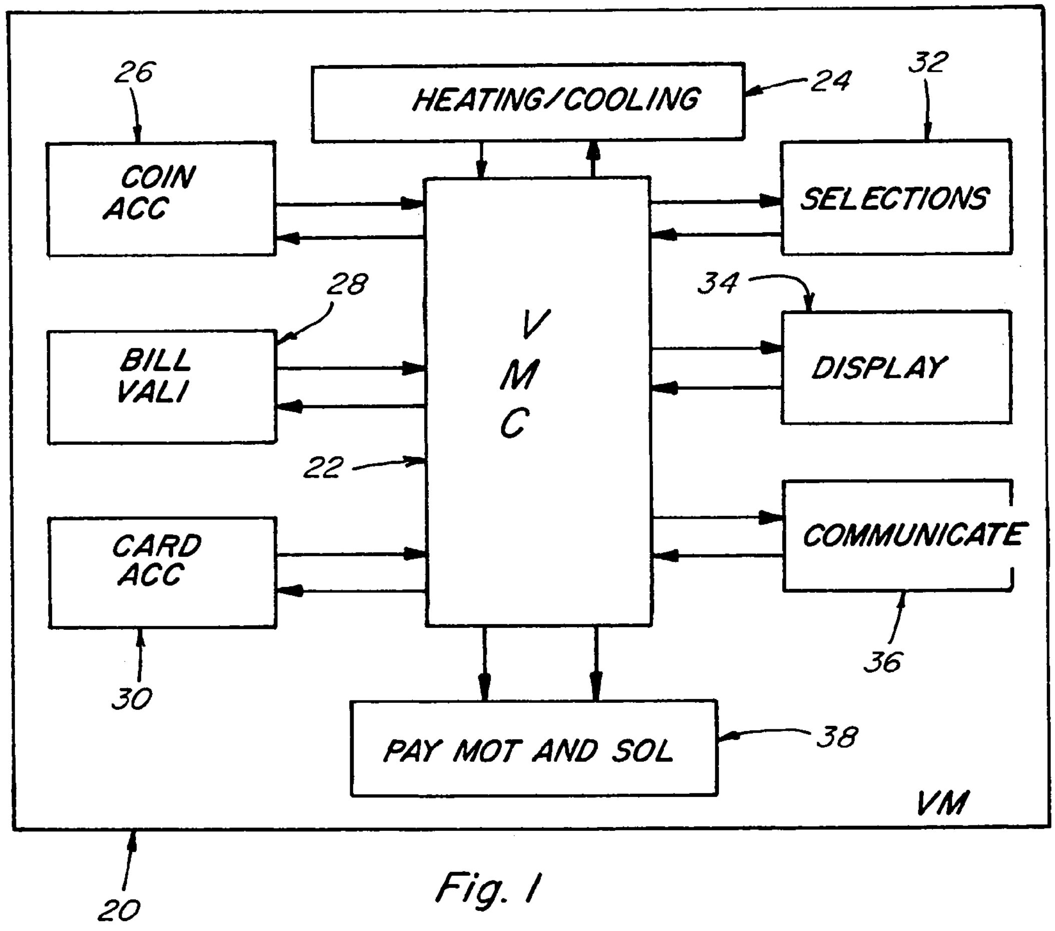

Referring to the drawings more particularly by reference numbers, number 20 in FIG. 1 identifies a block diagram showing the general components of a vending machine in a parallel configuration. The components 20 include a control portion 22 which has a plurality of connections to various control devices including to a heating and/or cooling unit 24, a coin accumulation control 26, a bill validator control 28, a credit card control portion 30, a first selection control portion 32 which enables the customer to select a particular product or products desired, a display control 34, a communication control 36 and a payout motor control including a solenoid portion 38 which controls the refunding of excess amounts deposited. All of the controls 24–38 are connected to the vending machine control and are used to control the various operations of the vending machine.

Figure 2:
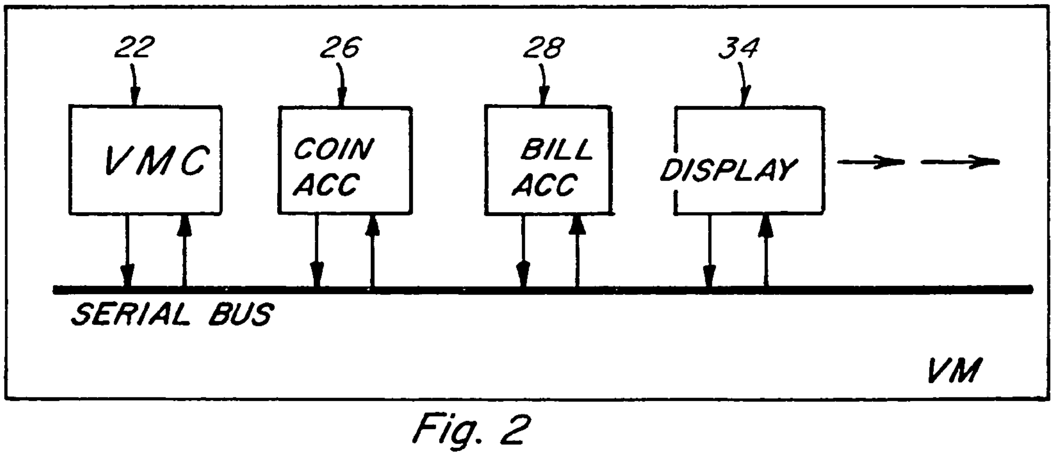
FIG. 2 is another block diagram of a control configuration for controlling the operation of a vending machine.

FIG. 2 shows another variation of the controls for the vending machine including a serial configuration wherein the vending machine control portion 22 is controlled by a serial configuration including the coin accumulation means 26, the bill validator 28 and the control display 34 all serially connected.

Figure 3:
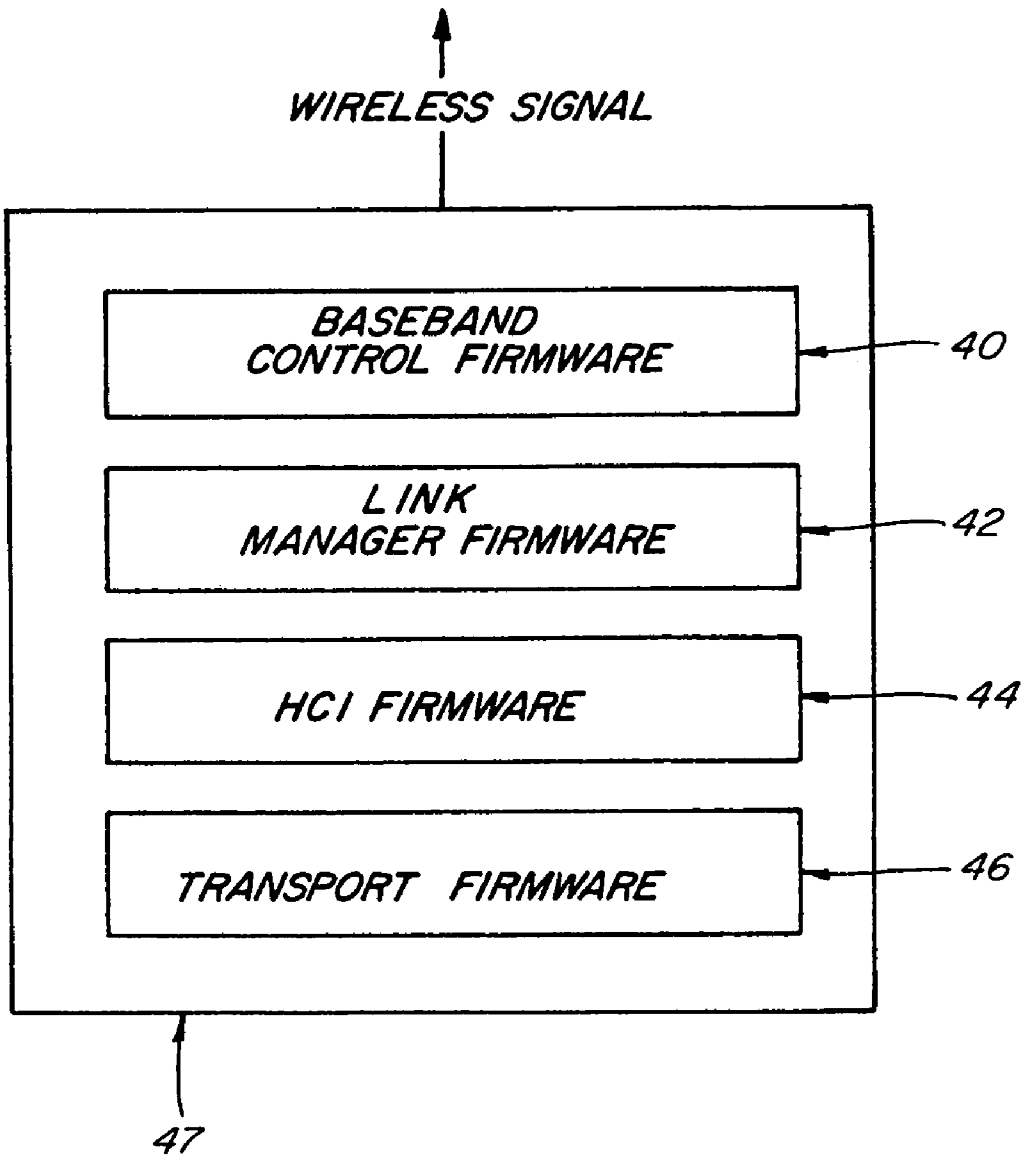
FIG. 3 is a block diagram of the hardware control means to be added to every intelligent module of the vending machine.

FIG. 3 is a schematic block diagram of the controls for controlling the operation of one or more vending machines wherein the control means do not require any wire or other physical connection between the control means and the vending machines. The block diagram shown in FIG. 3 includes a base band control firmware section 40, a link manager firmware section 42, a host controller interface firmware section 44 and a transport firmware section 46. The hardware shown in FIG. 3 is shown in schematic form which sometimes is referred to as a module 47, one of which will be attached to every machine module or host which is to be controlled by the subject system. The schematic shown in FIG. 3 can be controlled in a manner somewhat similar to a radio, a television or telephone and does not require any physical connections between the member or members being controlled and the control is accomplished by transmitting and receiving signals such as radio frequency signals which can be controlled in such a manner that they can not be taken advantage of or entered by outsiders. The vending machines controlled by the subject invention are equipped with wireless communicator devices such as short distance wireless communicator devices and the vending machine harnesses or wire connections employed heretofore are eliminated when using the present device.

Figure 4:
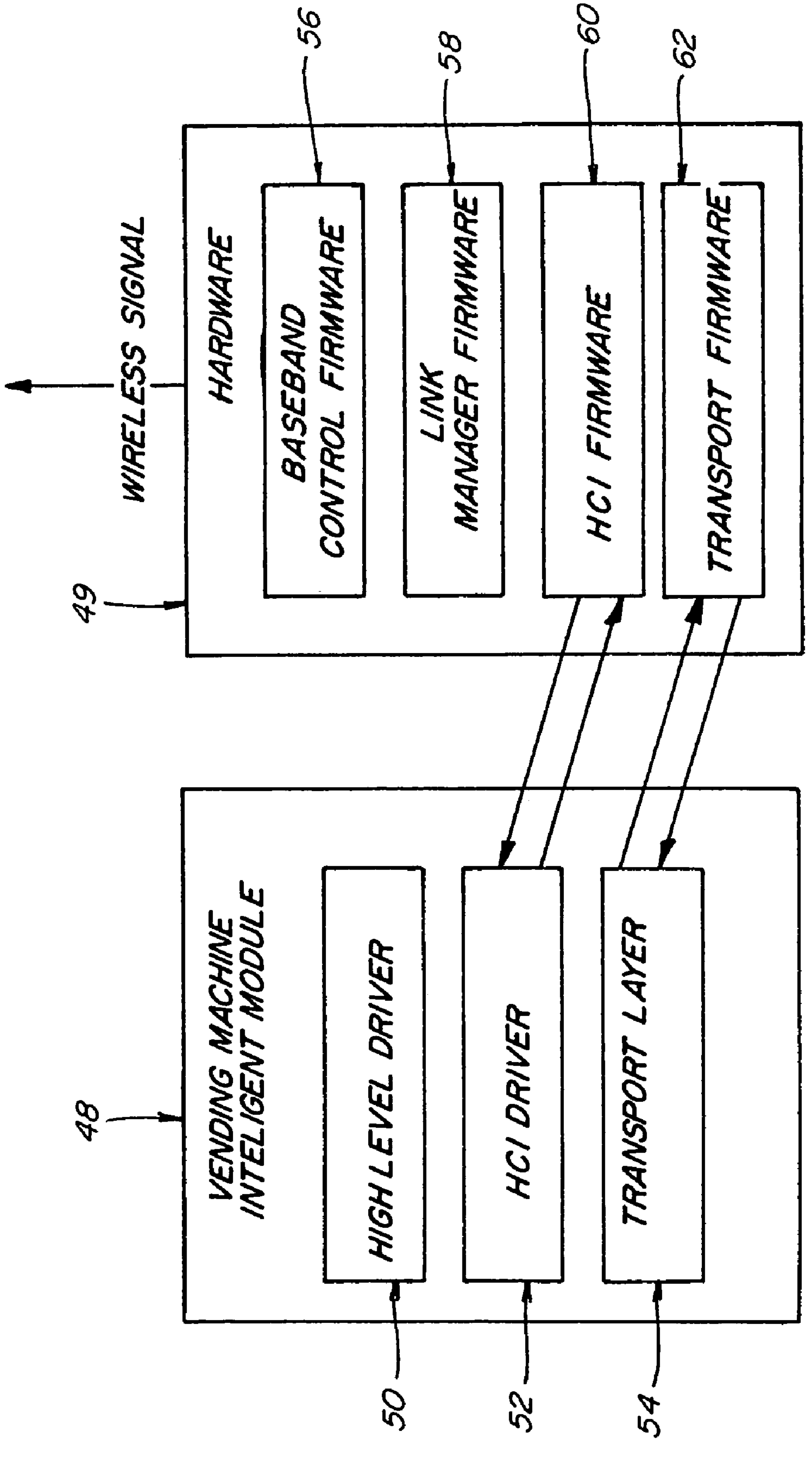
FIG. 4 is a block diagram of the modules in the vending machine after the machine has been adapted per this invention.

FIG. 4 is a block diagram showing the interconnections between a vending machine intelligence module 48 and control module 49. The vending machine intelligence module 48 includes a high level driver portion 50, a host controller interface driver 52, and a transport layer shown as block 54. The control portion includes base band control firmware 56, a link manager 58, a host controller interface firmware portion 60 and a transport firmware portion 62.

Figure 5:
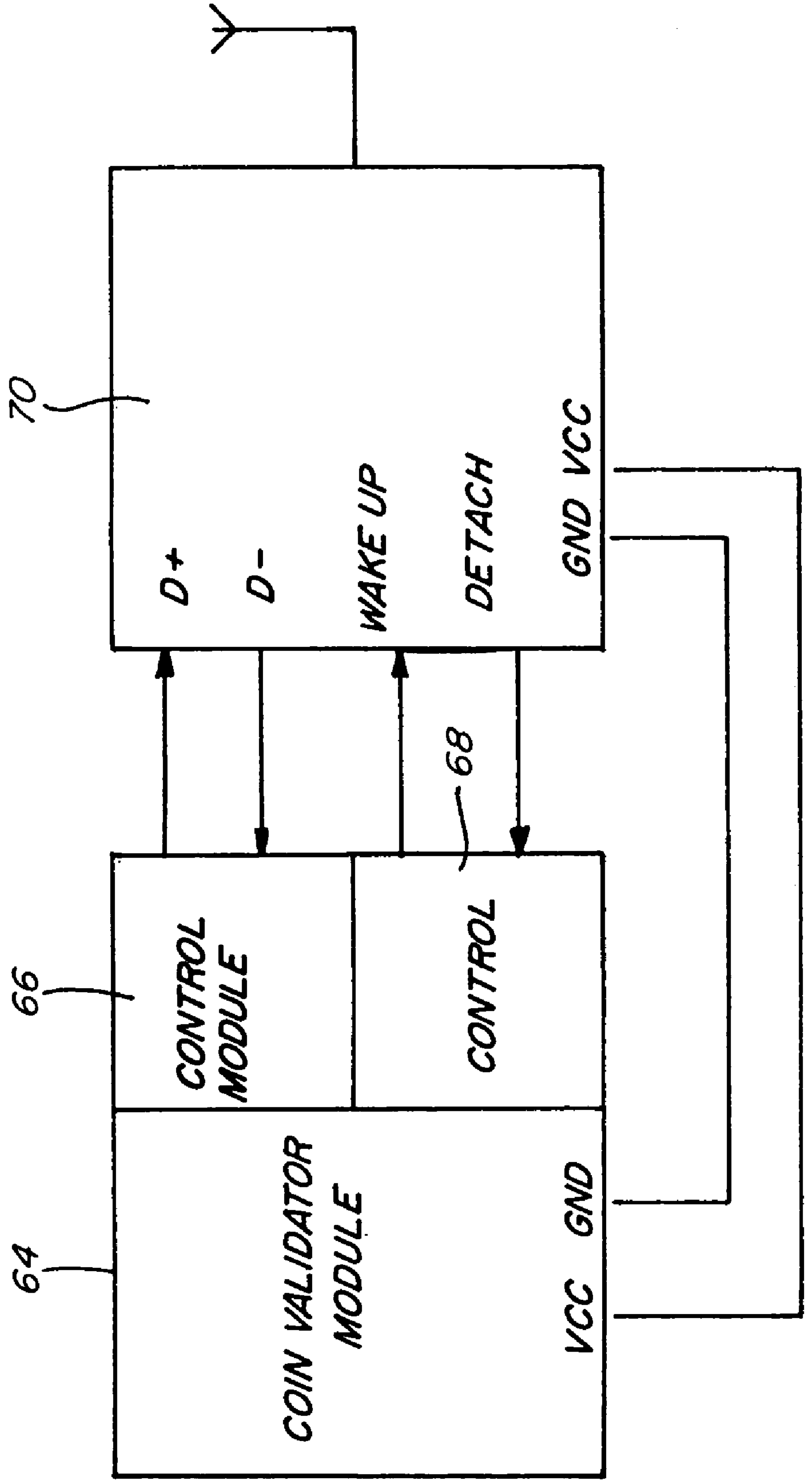
FIG. 5 is a block diagram of the changer module for use in the subject invention.

FIG. 5 is a block diagram showing a coin validator module 64 with electrical and other connections thereto. The coin validator module 64 has associated with it modules 66 and 68, and an associated control module 70 which has a wake-up connection with the control module 68, and a detach connection 71 with the same control module 68. Other circuit connections are also provided between the coin validator module 64 and the control module 70.

Figure 6:
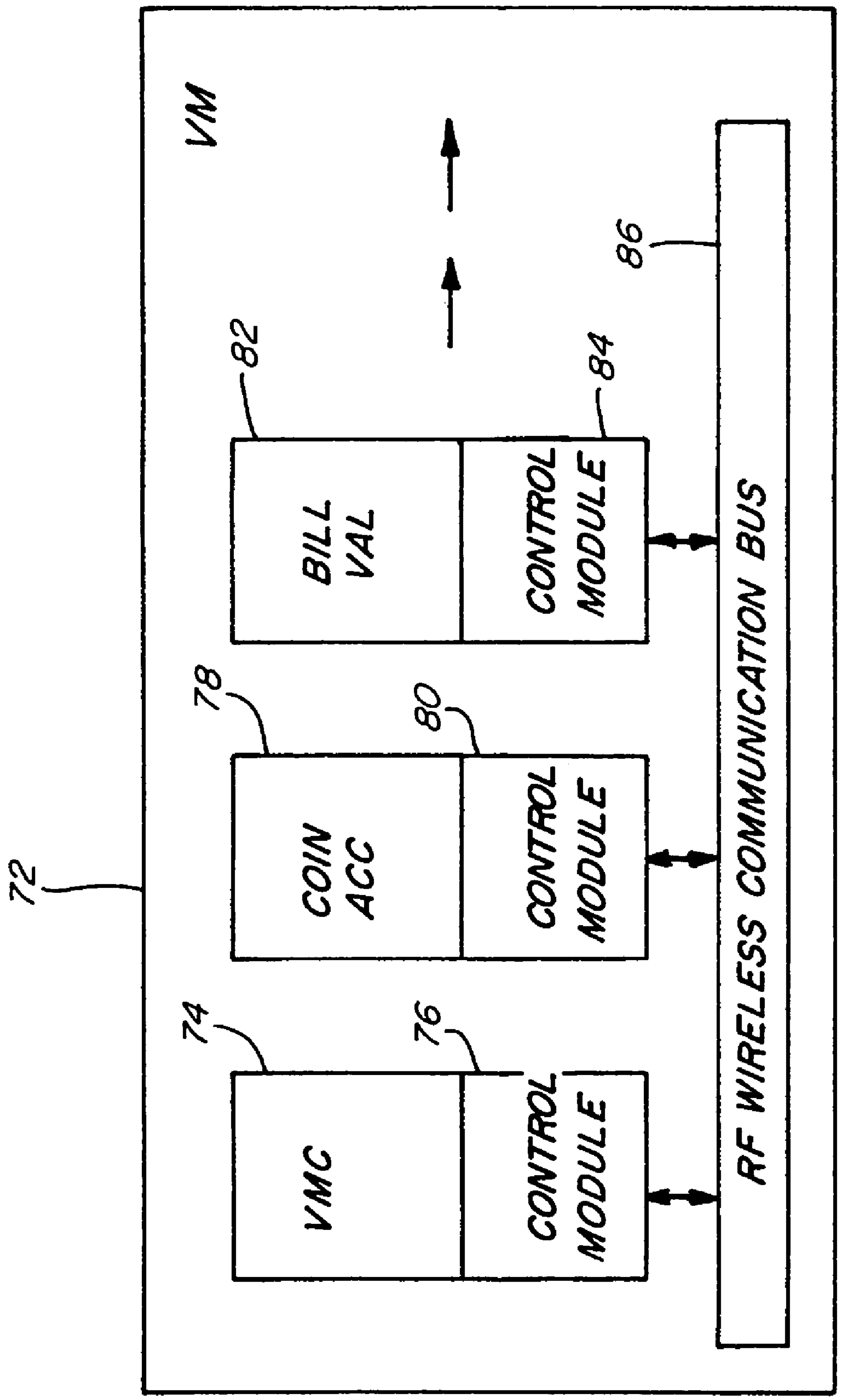
FIG. 6 is a block diagram depicting the use of a wireless relationship between control means and a vending machine controlled thereby.

FIG. 6 illustrates a wireless vending machine 72 with a vending machine control 74, a control module 76 associated with the vending machine control 74, a coin or credit accumulator circuit portion 78, an associated control module 80, and a bill validator module 82 also associated with its own control module 84. The modules 76, 80 and 84 are also associated with a radio frequency wireless communication bus 86.

An important aspect of the present invention resides in the fact that it may be used with vending machines that provide a way for a customer to use them when depositing or entering credit in one form or another and in being able to use the established credit in any one or more of a plurality of vending machines. In other words, the same deposit can be used with one or with a plurality of vending machines depending upon the desires of the customer and the products vended by the various vending machines. In this case, every vending machine in the system will be coupled to the same RF wireless communication bus 86 and all of the venders will be able to communicate with each other on the same or similar radio frequency bus. One, and only one vending machine needs to be equipped with means for accepting money either in the form of coins, bills, credit cards or the like, and this represents an important advantage because it means that a plurality of vending machines can be controlled by the same or similar control means sometimes referred to as an RF module.

Each of the venders included in the present system may be equipped or not equipped to vend products to customers but the system always has the ability to accumulate the customer's credit that can be received by one or a plurality of means and the credit can be used by any one or more of the vending machines that make up the system to enable the customer to choose products from any of the machines even though all of the credit is entered in the same or similar machine. It is also possible with the present system for the customer to use means to identify himself or herself to a particular vender in the system that holds the product or products to be purchased. The central payment machine will then receive the credit from the customer, release a numeric code, coupon or other means that the customer can later use to identify himself or herself to anyone of the venders in the system and to control the amount of money or credit that is deposited or entered so that the proper amount will be deducted as products are ordered and dispensed and appropriate change or credit is made. After identification of the customer, the customer can purchase the selected product or products for the credit accumulated and will be paid back any excess deposited regardless of which products are purchased and the amount of credit that has been deposited or entered.

The present system has several novel features about it including the importance of using a wireless communication system such as a wireless vending machine system, and only one vending machine needs to be equipped to receive credit but any one or more can dispense a product or products for the established credit, keeping in mind that the appropriate amount of change will be returned to the customer based upon the amount of credit entered and the cost of the product or products that are purchased.

Figure 7:
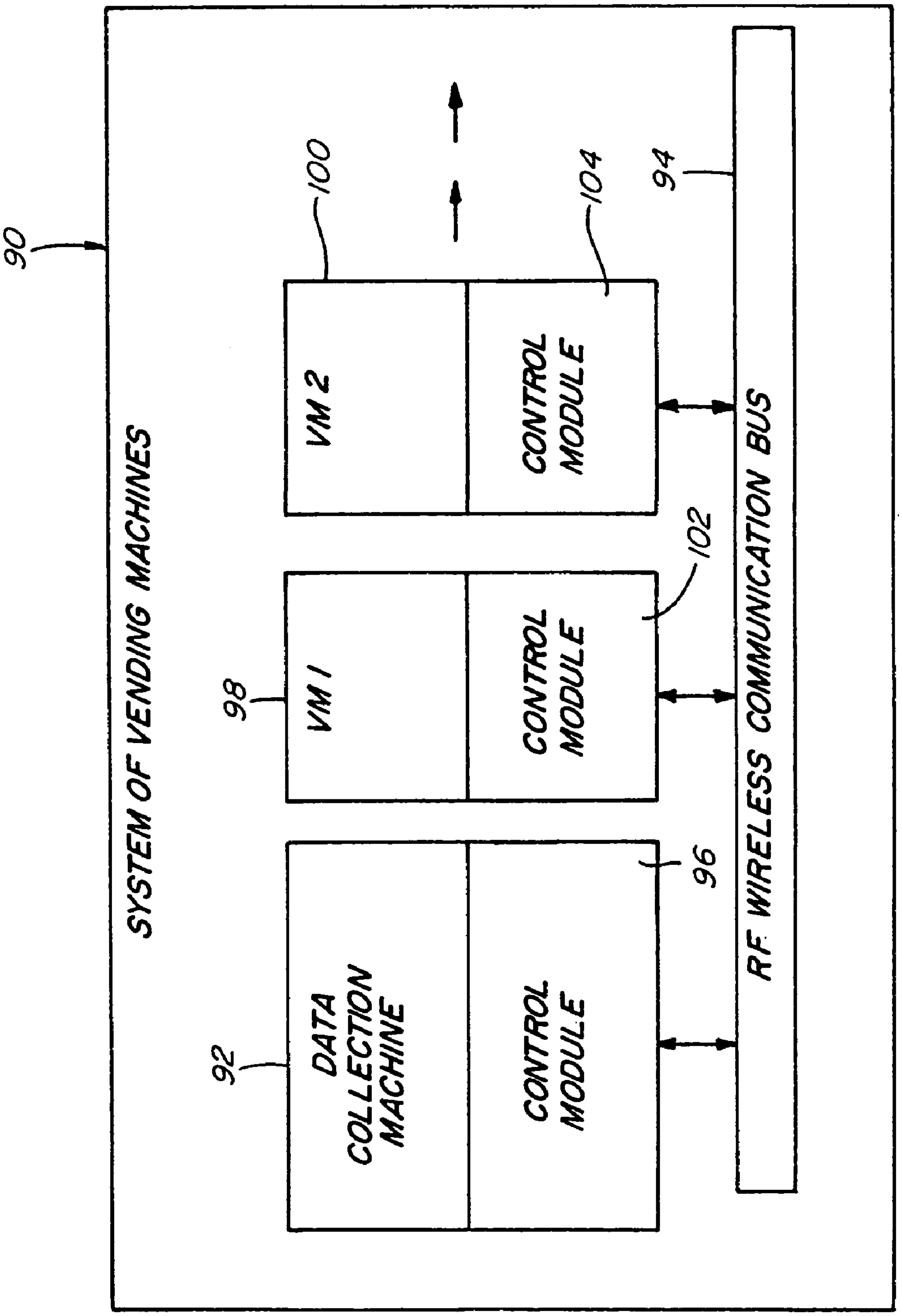
FIG. 7 is a block diagram of the present device used for controlling a plurality of vending machines.

FIG. 7 shows another embodiment 90 of the invention that relates to a method of monitoring data from a system such as a system of vending machines to a central location. In this embodiment, the central payment machine is replaced with a central data collection machine 92. In this system, the vendor transmits all of the input data to an external device equipped with a radio frequency (RF) wireless bus 94. The external device can be a modem, an interface to an internet device, a cellular telephone, a long distance radio frequency device, or something similar that can eventually send data to a specific central location. In FIG. 7, there is a central data collection machine 92 operator in association with, an associated control module 96 which is connected to the RF wireless communication bus 94, and the RF wireless communication bus 94 can in turn be made to transfer information to one or more vending machines such as machines 98 and 100, each of which has its own control module 102 and 104.

Figure 8:
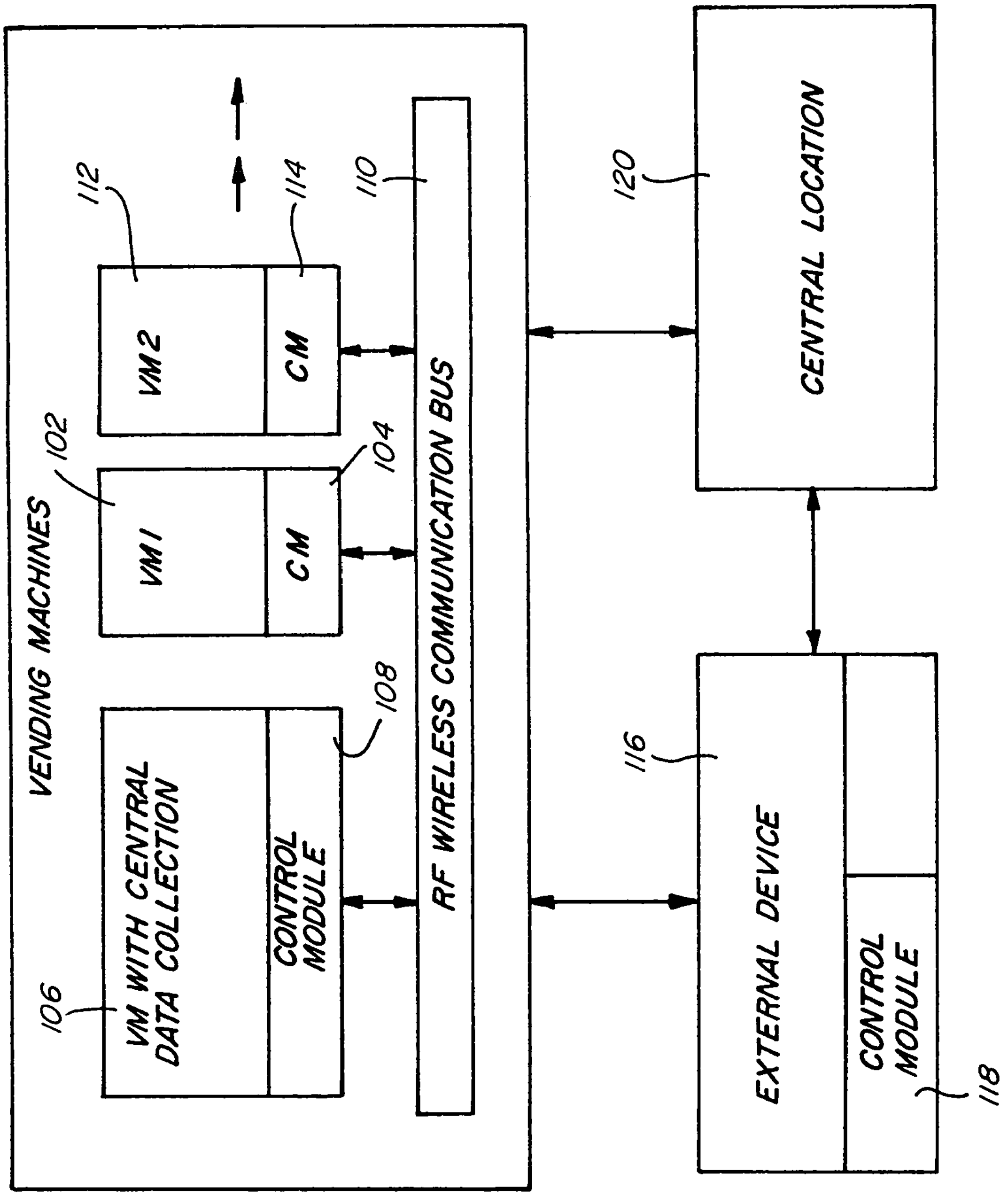
FIG. 8 is a block diagram similar to FIG. 7 but showing the inclusion of additional controls for the subject device.

FIG. 8 shows another embodiment which also teaches a way of interconnecting vending machines and modules. In this case, the vending machine 100 has a control module 104 and includes a central data collection portion 106 which is able to communicate through control module 108 with RF wireless communication bus 110. This embodiment has another vending machine 112 and its control module 114 which likewise can communicate with the central data collection portion 106 through the RF wireless communication bus 110. In the case of the embodiment shown in FIG. 8, there is also provided an external device 116 with an associated module 118. The external device 116 communicates with the vending machines 102 and 112 disclosed above as well as with a central location device 120 which in this case may be the location where the customer deposits his money or enters his credit and gets his change. In this case the customer is able to select articles from one or more vending machines and have any excess deposit returned.

As indicated above, one of the important aspects of the present invention resides in the fact that the present system, regardless of which embodiment is chosen, is a wireless system which can be made to operate within a desired range or distance and provides the customer as well as the owner of the system with many options and with an absence of wire connections between the various system elements. Thus there has been shown and described, several embodiments of a system such as a vending machine system which does not require wire connections between the vending machines and the control means therefor and yet is able to vend one or more products from one or more vending machines and it can do so while also enabling the customer to be paid back any excess deposit or credit entry. Thus the present system is highly flexible and versatile, is relatively inexpensive to make and can be used to control one or more machines.

The fact that the present system does not require any hardwire connections between the control unit or units and the machines being controlled thereby adds to the flexibility and versatility of the system and enables the present system to be used with systems such as Bluetooth systems which are systems that do not require physical connections between the various units that are controlling and controlled. The present system does however use radio frequency (RF) networking technology and provides an energy-saving, safe, and low cost RF technology without cable connections being required. It is also important to note that with this type of wireless RF connection the devices being controlled and doing the controlling can communicate amongst each other without having a line of sight or physical connection. The present system can also use frequency hopping which provides a high level of security against eavesdropping and fraudulent access. These are important advantages especially in a system such as one that controls one or more vending machines which usually are located in relatively close proximity to one another or may be separated by greater distances depending on the strength of the RF signals that are used. In this regard, the present system can also support "point-to-point" and "point-to-multipoint" connections and the same or similar control can be used to control vending machines in more than one location so long as the distance that the RF signals can be transmitted is known and made available. The present invention also provides a new method that a customer can use to deposit money or enter credit and still be able by doing so to establish credit that can be used in any of a plurality of venders. In such a system every one of the vending machines is equipped with an RF virtual communication bus as described above and all of the venders in the system can communicate with each other over the RF bus. In a typical system, one and only one vending machine may be equipped with means for accepting money or credit and this machine can be referred to as the central payment machine. This vender may be equipped or not to vend products to the customer but it always has the function of accumulating the customer's credit and enables this credit to be used by any one or more of the vending machines that make up the system. The customer may also be able to establish his identity to a particular vender that holds a product or products that he wants to purchase. In this case the central payment machine will receive the credit from the customer and may release a "numeric code", a "coupon" or other means that the customer can later use to identify himself to any one or more of the venders in the system. Thereafter the customer can purchase products from any one of the venders in the system to use up the balance of the credit. Thus the present system has several novel features including being a wireless communication system in which one or several machines are equipped to receive credit but any one or more of the machines in the system can vend a product or products for the credit that has been established in the system.

Yet another aspect of the present invention is that it produces a novel method of monitoring data from one part of a system to another such as to a central location. The data that is monitored can then be used to produce later vending operations or return of excess cash or credit. In the system as is shown in FIG. 8, the central payment machine is replaced with a central data collection machine and this vender will communicate all of the data to an external device equipped with a similar radio frequency wireless bus that can be used to transmit the information stored between the machines that are parts of the system. The external device in such a system could be a modem, an interface, a cellular telephone, a long distance radio frequency device, or a similar device such as shown in FIG. 8.

Thus there has been shown and described, several embodiments of a wireless system, particularly adaptable to control the operations of one or more vending machines or the like to accumulate cash or credit, to produce change when necessary, and to vend a product or products to a customer as required. Such a system is easy to operate by the customer and by the owner of the system and makes it possible to produce many operations including keeping track of more things than is presently available including in the vending industry. For example, with the present system, if one vending machine runs out of a product that is being vended in more than one machine, the customer can obtain the product from a different vending machine based on the amount of credit that he has established. Also the present device enables the owner of the vending machine to have a better means of keeping track of the amount of money received and paid out as well as the amount of product or products vended by each machine. The present invention therefore has major advantages both from the owner's and from the user's standpoint.

What is claimed is:

1. A process for controlling the operation of a vending machine based on the amount of credit entered without the necessity for hardwired connections between all of the components of the vending machine, the vending machine including a machine control component operable to control other vending machine components, the process including, establishing a way to transmit and receive signals over a wireless communications bus within the vending machine to control the performance of a vend operation, including providing a communications and control system for effecting an interchange of information between and among a plurality of the vending machine components over the wireless communications bus, said communications and control system including, for each of a plurality of the vending machine components, an associated receiver portion for receiving short distance communication signals transmitted over said wireless communications bus by others of said plurality of vending machine components and a transmitter portion for transmitting over said wireless communications bus short distance communications signals that can be received by the receiver portions of others of said plurality of vending machine components, said plurality of vending machine components being disposed within the vending machine to define a peer-to-peer network for the point-to-point interchange of information with others of said plurality of vending machine components over said wireless communications bus, establishing an entry of credit, effecting a vend operation depending upon the amount of credit entered and the cost of the operation, said machine control portion of said communications and control system being operable to establish the amount of credit entered in excess of the vend operation effected in order to determine an amount of credit to be returned to the customer in excess of the cost of the operation effected, at least certain of the actions of said plurality of vending machine components including the interchange of information over said wireless communications bus.

2. The process of claim 1 wherein the transmitter and receiver portions of the communications and control system operate at a radio frequency.

3. The process of claim 1 wherein the vending machine includes a credit entry component a vend delivery component, and a payback component and the communications and control system includes a radio frequency transmitter and a radio frequency receiver for and associated with each of said credit entry component, said vend delivery component, and said payback component.

4. A process for controlling the operation of a vending machine based upon the amount of credit available to a customer without the necessity for hardwired connections between all of the components of the vending machine, such vending machine including a credit entry component, a vend performance component, and a machine control component for controlling a vend operation, the process including establishing a way to transmit and receive short distance communications signals over a wireless communications bus within the vending machine to control the performance operations of the vending machine, including providing a communications and control system for effecting an interchange of information between and among a plurality of the vending machine components over the wireless communications bus, the communications and control system including a plurality of communications portions associated with respective vending machine components, positioning said vending machine components with respect to one another within the vending machine to define a peer-to-peer network for point-to-point exchange of information with others of said vending machine components over said wireless communications bus, establishing the amount of credit available to a customer, and, upon a determination that the amount of credit available at the time of a desired vend operation is at least equal to the price associated with such vend operation, effecting and controlling performance of such vend operation.

5. The process of claim 4 wherein said communications portions include a baseband control firmware portion, a link manager firmware portion, a host controller interface firmware portion, and a transport firmware portion.

6. The process of claim 4 wherein said short distance communications signals are short range radio frequency signals.

7. The process of claim 6 wherein said communications portion is Bluetooth-compliant.

8. The process of claim 4 wherein said vending system machine includes a coin payout portion operable under control of said machine control component to effect the payback of credit in excess of the price of a vend operation.

9. A vending machine comprising a plurality of distinguishable vending machine portions including a credit entry portion for accepting credit entries, an operation request portion responsive to customer activation to request performance of a vend operation, a machine control portion operable to accumulate the amount of credit entered by and available to a customer and to control performance of a vend operation by said vending machine, and a vend delivery portion for performing a vend operation when the amount of credit available to a customer at least equals the cost of the operation to be performed, at least a plurality of said vending machine portions each having an associated communications control portion configurable to effect the interchange of information over a wireless bus and operable to transmit and receive short distance communications signals, said plurality of vending machine portions being positioned with respect to one another to be within range of said short distance communications signals, said positioned portions defining a peer-to-peer network having a wireless communications bus accessible through said communications control portion interconnecting said positioned portions for point-to-point communications among the vending machine portions, said communications control portions including transmitting and receiving devices that communicate with one another over said wireless bus.

10. The vending machine of claim 9 wherein said communications control portions include a baseband control firmware portion, a link manager firmware portion, a host controller interface firmware portion, and a transport firmware portion.

11. The vending machine of claim 9 wherein said communications signals transmitted by said communications control portion are short range radio frequency signals.

12. The vending machine of claim 11 wherein said communications control portion is Bluetooth-compliant.

13. A method of enabling wireless communications among a plurality of distinguishable portions of a vending machine and operation of such vending machine, wherein such vending machine includes a credit entry portion for accepting credit entries, an operation request portion responsive to customer activation to request performance of a vend operation, a machine control portion operable to accumulate the amount of credit entered by and available to a customer and to control performance of a vend operation by said vending machine, and a vend delivery portion for performing a vend operation when the amount of credit available to a customer at least equals the cost of the operation to be performed, comprising providing and associating with a plurality of vending machine portions a communications control portion configurable to effect the interchange of information over a wireless bus and operable to transmit and receive short distance communication signals, configuring the plurality of vending machine portions and their associated communications control portions to be able to communicate with other vending machine portions in a peer-to-peer network over a wireless communications bus accessible through said communications control portions interconnecting the vending machine portions, positioning the plurality of vending machine portions with respect to one another to be within range of said short distance communication signals, the positioned plurality of vending machine portions defining a peer-to-peer network having a wireless communications bus accessible through said communications control portions interconnecting the positioned plurality of vending machine portions for point-to-point communications, configuring the credit entry portion of the vending machine to receive credit deposits made by a customer and to provide data representative of credit deposits to said machine control portion, configuring the machine control portion to determine the amount of credit available to a customer for vend purchasing, configuring the vend delivery portion to effect a vend dispensing operation of a product selected by a customer upon verification of appropriate vend conditions including sufficient credit availability for the vend selection made by the customer.

14. The method of claim 13 wherein said communications control portions include a baseband control firmware portion, a link manager firmware portion, a host controller interface firmware portion, and a transport firmware portion.

15. The method of claim 13 wherein said communications signals transmitted by said communications control portion are short range radio frequency signals.

16. The method of claim 15 wherein said communications control portion is Bluetooth-compliant.

17. A method for enabling wireless communications among a plurality of component portions within a vending machine, including providing and associating with each of a plurality of vending machine portions a communications control portion configurable to effect the interchange of information over a wireless communications bus and operable to transmit and receive short distance communications signals, positioning said plurality of vending machine portions with respect to one another within the vending machine to be within range of said short distance communication signals, said positioned portions defining a peer-to-peer network having a wireless communications bus accessible through said communications control portion interconnecting said positioned portions for point-to-point communications among the vending machine portions.

18. The method of claim 17 wherein said communications control portions include transmitting and receiving devices that communicate with others of said communications control portions over said wireless communications bus.

19. The method of claim 17 wherein said plurality of vending machine components includes a credit entry portion, a vend control portion, and a vend delivery portion.

20. The method of claim 19 wherein said plurality of vending machine components further includes an excess credit payback portion.

21. The method of claim 17 wherein said communications control portion includes a baseband control firmware portions, a link manager firmware portion, a host controller interface firmware portion, and a transport firmware portion.

22. The method of claim 17 wherein said communications control portion is Bluetooth compliant.

23. In a vending machine having a number of component portions for effecting actions during a vend operation, the improvement comprising a plurality of communications control portions each associated with a respective one of a plurality of said component portions, said communications control portions each being configurable to effect the interchange of information over a wireless communications bus and operable to transmit and receive short distance communications signals, said plurality of said component portions being positioned within the vending machine to be within range of said short distance communications signals, said positioned component portions defining a peer-to-peer network having a wireless communications bus accessible by said component portions through the communications control portion associated therewith and being interconnected with one another through said wireless communications bus for point-to-point communication, said communications control portions including transmitting and receiving portions that communicate with the communications control portions of others of said plurality of component portions.

24. The improvement of claim 23 wherein said communications control portion includes a baseband control firmware portions, a link manager firmware portion, a host controller interface firmware portion, and a transport firmware portion.

25. The improvement of claim 23 wherein said short distance communications signals are short range radio frequency signals.

26. The improvement of claim 23 wherein said communications control portion is Bluetooth compliant.

27. The improvement of claim 23 wherein the component portions include at least a credit entry portion, a machine control portion, and a vend delivery portion, each of which portions are included within said plurality of component portions.

* * * * *

UNITED STATES PATENT AND TRADEMARK OFFICE

CERTIFICATE OF CORRECTION

PATENT NO. : 6,959,230 B1 
DATED : October 25, 2005
INVENTOR(S) : Mark H. Leibu and Gilbert W. Van Cleve It is certified that error appears in the above-identified patent and that said Letters Patent is hereby corrected as shown below:

Column 9,
Lines 48-53, should read:
-- said positioned portions defining a peer-to-peer network having a wireless communications bus accessible through said communications control portion interconnecting said positioned portions for point-to-point communications among the vending machine portions. --.

Signed and Sealed this

Third Day of January, 2006

JON W. DUDAS
*Director of the United States Patent and Trademark Office*